(12) United States Patent
Atkins et al.

(10) Patent No.: US 8,812,853 B1
(45) Date of Patent: Aug. 19, 2014

(54) TRACEABILITY FOR THREADED COMMUNICATIONS

(75) Inventors: Richard Atkins, Chatswood (AU); Sunny Kalsi, Macquarie Fields (AU); Rohan Lenard, Hunters Hill (AU); David Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 895 days.

(21) Appl. No.: 12/050,294

(22) Filed: Mar. 18, 2008

(51) Int. Cl.
*H04N 21/8358* (2011.01)

(52) U.S. Cl.
USPC ............................................. 713/176

(58) Field of Classification Search
USPC .................... 713/156, 176; 726/26
See application file for complete search history.

(56) References Cited

U.S. PATENT DOCUMENTS

| | | | | |
|---|---|---|---|---|
| 6,640,301 | B1* | 10/2003 | Ng | 713/156 |
| 7,032,224 | B2* | 4/2006 | Kadakia et al. | 719/313 |
| 7,143,091 | B2* | 11/2006 | Charnock et al. | 1/1 |
| 7,653,696 | B2* | 1/2010 | Brown et al. | 709/206 |
| 2003/0074317 | A1* | 4/2003 | Hofi | 705/44 |
| 2006/0265510 | A1* | 11/2006 | Warren et al. | 709/230 |
| 2007/0162300 | A1* | 7/2007 | Roever et al. | 705/1 |
| 2007/0299924 | A1* | 12/2007 | Tremblay | 709/206 |
| 2008/0222425 | A1* | 9/2008 | Buss | 713/185 |

FOREIGN PATENT DOCUMENTS

JP 2003345720 A * 12/2003

OTHER PUBLICATIONS

Fernstrom (Management of Trusted Citations, DocEng '03, Nov. 20-22, 2003, Grenoble, France, pp. 243-245).*
Osterbye, Kasper, "Structural and Cognitive Problems in Providing Version Control for Hypertext", Conference on Hypertext and Hypermedia, Proceedings of the ACM Conference on Hypertext, (Milan, Italy, 1993), pp. 33-42, ISBN 0-89791-547-X, ACM New York, NY, USA.
Bartel, et al., "XML-Signature Syntax and Processing", W3C Recommendation, Feb. 12, 200, pp. 1-60, The Internet Society & W3C.
Collins-Sussman, et al., "Version Control with Subversion: for Subversion 1.4", 2007, pp. 1-338.

* cited by examiner

*Primary Examiner* — Saleh Najjar
*Assistant Examiner* — Shu Chun Gao (57) ABSTRACT

Individual chunks of a message are signed with their originators' signatures, thereby providing traceability in threaded messages so that every contributor's content as well as modifications thereof can be identified.

12 Claims, 10 Drawing Sheets

```
From:    jsmith@example.com
...
Subject: Hi Sunny

<signedchunk author="jsmith@example.com" signature="hexstringA">
Hi Sunny,
</signedchunk>
<signedchunk author="jsmith@example.com" signature="hexstringB">
I'm just writing a quick email just to say hello, and to demonstrate an example.
Hope you find it useful. Goodbye.
</signedchunk>
<signedchunk author="jsmith@example.com" signature="hexstringC">
- John Smith (jsmith@example.com)
</signedchunk>
```

FIG. 14

From:    jsmith@example.com
...
Subject: Hi Sunny

[SV] Hi Sunny,

[SV] I'm just writing a quick email just to say hello, and to demonstrate an example. Hope you find it useful. Goodbye.

[SV] - John Smith (jsmith@example.com)

FIG. 15

```
From:    kalsi@example.com
...
Subject: Hi John

<signedchunk author="kalsi@example.com" signature="hexstringD">
Hi John,
</signedchunk>
<signedchunk author="kalsi@example.com" signature="hexstringE">
I just got your email, the one where you said <quote refid="001" start="0"
length="50" />, and later <quote refid="001" start="57" length="23" />. I'd like
to say hello to you too!
</signedchunk>
<signedchunk author="kalsi@example.com" signature="hexstringF">
- Sunny Kalsi (kalsi@example.com)
</signedchunk>
<quotation refid="001" author="jsmith@example.com" signature="hexstringB">
I'm just writing a quick email just to say hello, and to demonstrate an example.
Hope you find it useful. Goodbye.
</quotation>
```

FIG. 16

```
From:    kalsi@example.com
...
Subject: Hi John

[SV] Hi John,

I just got your email, the one where you said "I'm just writing a quick email
[SV] just to say hello, [...]", and later "[...]demonstrate an example". I'd like to
     say hello to you too!

[SV] - Sunny Kalsi (kalsi@example.com)
```

TRACEABILITY FOR THREADED COMMUNICATIONS

TECHNICAL FIELD

This invention relates generally to electronic messaging.

BACKGROUND OF THE INVENTION

A threaded message is one that includes parts of one or more prior messages. A message can be any kind of electronic communication or document. Examples of threaded messages include newsgroups postings, blog dialogs, and response or forwarded emails.

In a threaded message that has many contributors, it often becomes difficult to determine who said what. It is also possible for the sender to change a contributor's contribution, either intentionally or accidentally, without it being evident that something has been changed or what has been changed.

To prevent being mis-quoted or to have their contribution changed in an undesired manner, contributors would like to be able to protect their contributions against unwanted manipulation. While a sender of a message can protect the entire communication by signing it, separately protecting different parts of the message or having different parts "owned" (protected by) different authors does not appear to be possible.

It is possible to use a source-control system to track an email thread. However, issues arise when forwarding messages, quoting text in a reply, having multiple branches in a thread, or having a message which does not quote the previous work at all. Because version control has no concept of a "message", and assumes change tracking based on a linear progression of changes to a complete file, the random changes in an email thread, cross-quoting, and other activities inherent in messaging do not have clear analogs in version control. In addition, few version control systems have any way of communicating between multiple servers, and maintaining changes between them in an authenticated way.

The change-logging capability of Microsoft Word can be used to show which pieces of a document were edited by whom, and the document may be sent as an attachment to a (blank) email. Not only is this not authenticated, it also suffers from similar problems as the source-control system, as it generally cannot cope with cut-and-paste quoting, multiple branches, or replies with no reference to the original text.

Version-control systems for general software development make it possible to determine who made what changes to a given file. But these tools do not make tracking text through a threaded email simple. Furthermore, detecting that a text fragment (i.e., a quote) was actually sourced from another email is not handled by such tools; an external system of linkages is required (e.g., a convention for checking comments).

XML digital signature-processing rules and syntax provide a mechanism for non-repudiation or encryption of arbitrary fragments of XML. However, they do not easily allow for in-fragment editing of a clear demarcation of a fragment's lineage. They also do not provide a renderer or an editor that could be used by a communications client.

SUMMARY OF THE INVENTION

This invention addresses these and other problems and disadvantages of the prior art. The invention provides traceability in a threaded message so that every contributor's content and modifications of any contributor's content are identifiable.

According to one aspect of the invention, a first message is broken up into chunks and at least some of the chunks are signed with a signature of the originator of the message, prior to delivery of the first message to a recipient. The source of each signed chunk and whether or not it has been changed can thus be verified.

According to another aspect of the invention, a quotation from a signed chunk of a second message is incorporated into the first message prior to delivery of the first message to the recipient. In response to the incorporating, the chunk of the second message that is the source of the quotation and its signature are made available to the recipient. Illustratively, if the quotation is the whole source chunk, the source chunk and its signature are incorporated into the first message, but if the quotation is less than the work source chunk, the source chunk and its signature are appended to the first message. The source chunk and its signature can thus be used to verify the source of the quotation and whether or not it has been changed.

According to a third aspect of the invention, verification of signatures is performed for the received first message, and the received first message is displayed along with an indication for each chunk of the first message of whether: the chunk is not signed; the chunk is signed with a verified signature; or the chunk is signed but the signature cannot be verified. The recipient thus can determine the amount of trust that he or she can place in each chunk of the received message.

According to a fourth aspect of the invention, in response to the recipient selecting the delimiting character of a quote in the displayed first message, the source chunk of the quotation is displayed. The recipient can thus determine the context of the quotation, and consequently can determine the amount of trust that he or she can place in the quotation.

The term "message" is used broadly herein to encompass any communication.

While the invention has been characterized in terms of method, it also encompasses apparatus that performs the method, and any computer-readable store containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
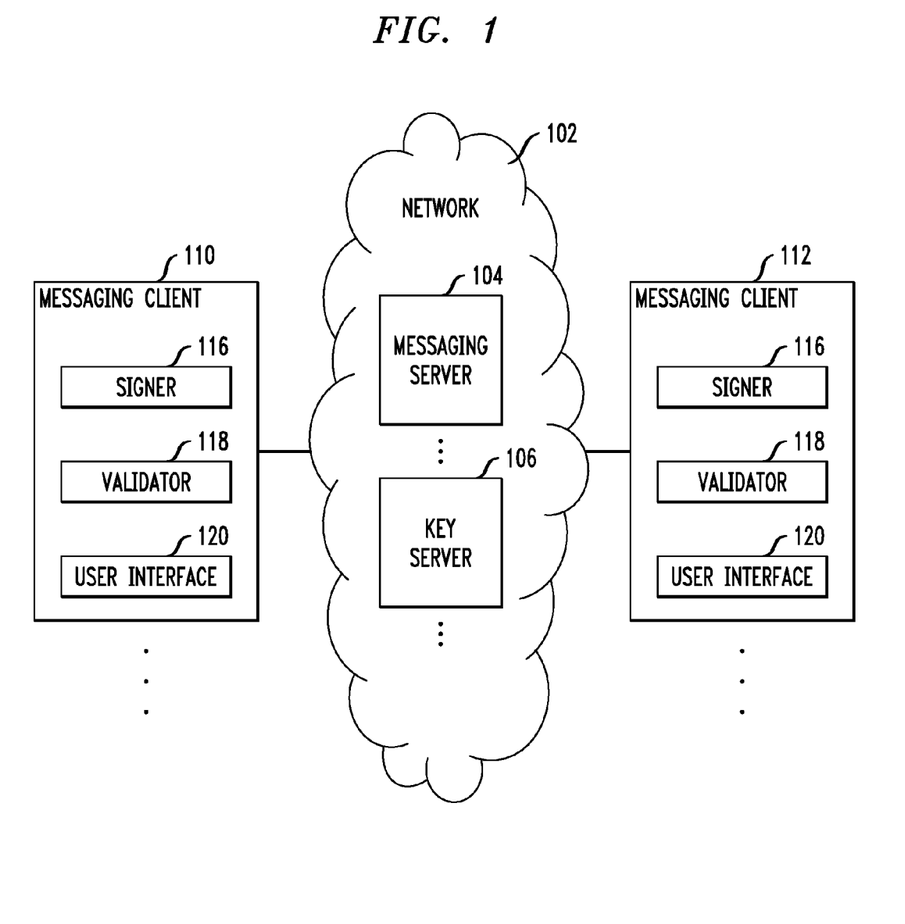
FIG. 1 is a block diagram of a communications system that includes a first illustrative embodiment of the invention.

FIG. 1 shows a message communications system comprising a plurality of messaging clients 110, 112 interconnected by a communications network 102 that includes one or more messaging servers 104 and one or more key servers 106. The system of FIG. 1 is illustratively an email system where messaging server 104 is an email server, but can just as well be an audio communications system, an instant messaging system, a multimedia (e.g., audio-visual) system, etc. Messaging clients 110, 112 are illustratively stored-program controlled communications devices, such as personal computers, personal digital assistants, wireless display telephones, etc. Each comprises a store for storing control programs and data, a processor for executing the programs and using and/or generating the data in the store, and a user interface 120 such as a keyboard or a mouse and a display. Network 102 is illustratively a wired or a wireless data or multimedia communications network, such as the public or a private telephone communications network, a local area network, the Internet, etc. As described, the system of FIG. 1 is conventional.

According to a first illustrative embodiment of the invention, shown in FIG. 1, at least some messaging clients 110, 112 each include a message signer 116 and a signature validator 118. The operation of clients 110, 112 that is relevant to an understanding of this invention is show in FIGS. 2-5.

Figure 2:
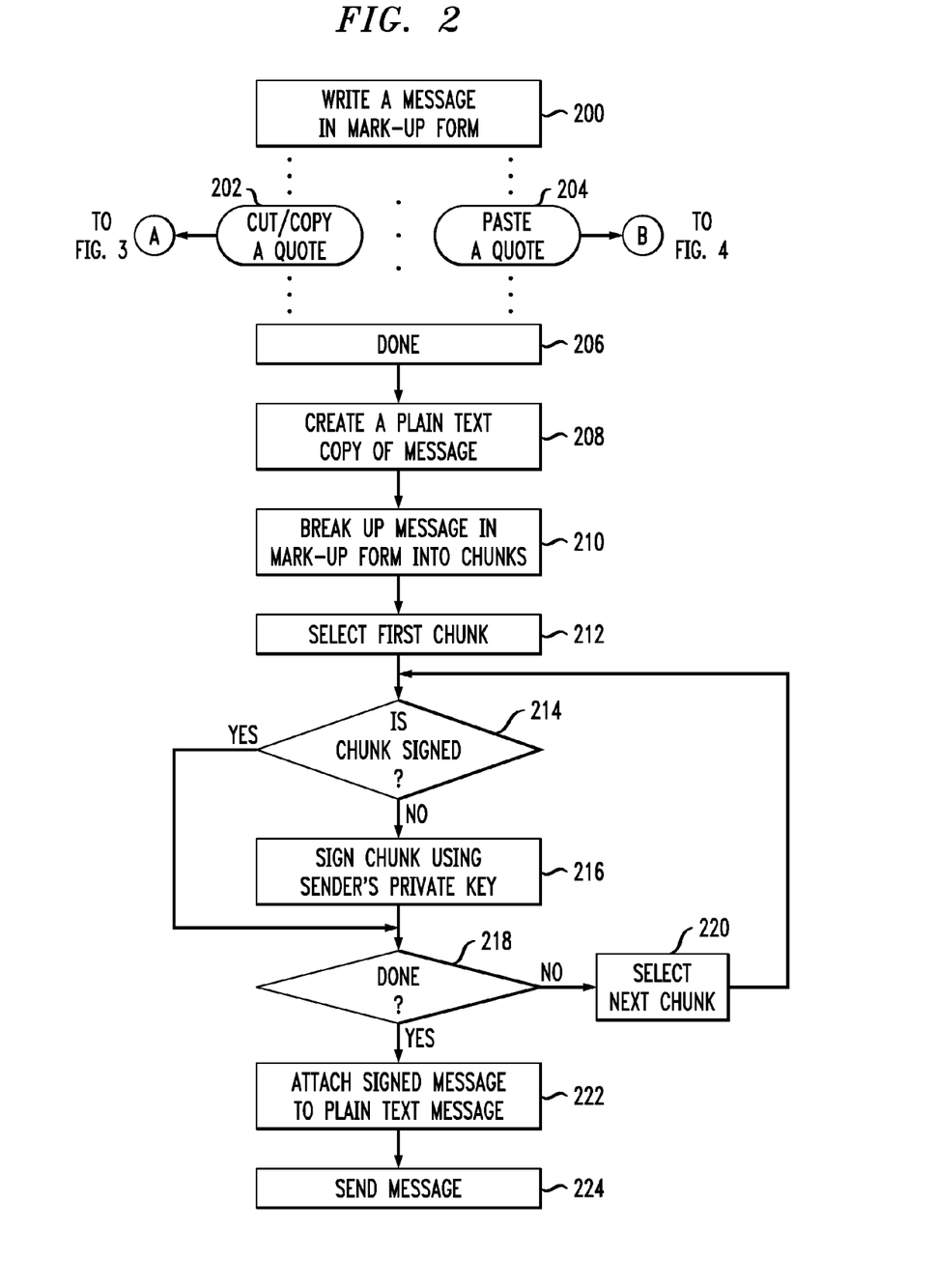
FIG. 2 is a functional flow diagram of message-generation operations of a messaging client of the system of FIG. 1.
Figure 13:
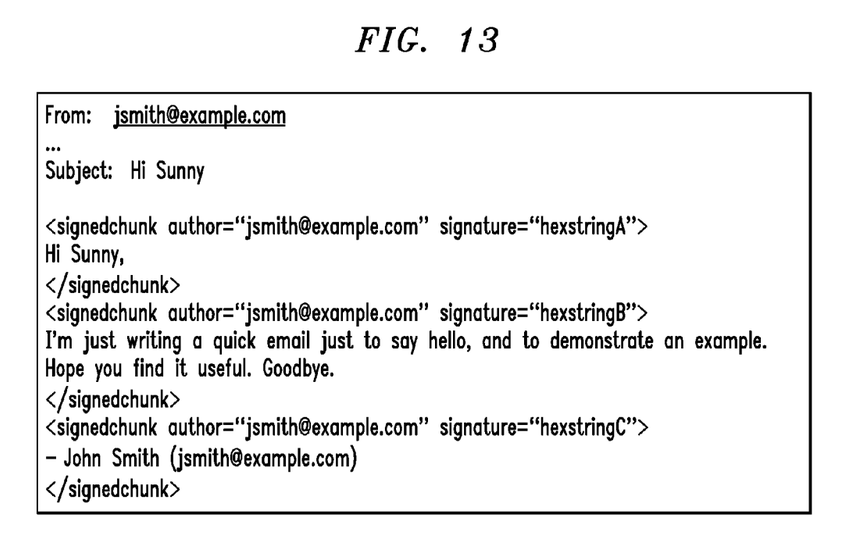
FIG. 13 shows an illustrative message generated by the operation of FIG. 2.

FIG. 2 illustrates the process of generating a message on a client 110, 112 of FIG. 1—let us assume client 110 for purposes of illustration. When a user of client 110 writes a message, client 110 uses a mark-up language, such as HTML, to form the message in mark-up form, in a conventional manner, at step 200. Let us assume that the message does not contain quotes from any other materials, and therefore the process bypasses steps 202 and 204. When the user finishes writing the message, as indicated at step 206, client 110 creates a plain-text copy of the message, at step 208. Client 110 then breaks up the message in mark-up form into chunks, at step 210. Chunks are portions of the message that can be of any desired size, and may vary in size. For example, each paragraph may form a chunk. Client 110 then selects the first chunk, at step 212, and checks whether the chunk is signed, at step 214. Because, steps 202 and 204 have been bypassed, no chunk is signed. Client 110 therefore uses the sender's private encryption key to sign the chunk, at step 216, in a conventional manner. The sender's key is the private-key half of a conventional asymmetric key encryption algorithm, such as that used in PGP. The signature involves surrounding the chunk with tags of the mark-up language to identify the chunk as a signed entity, and performing a hash function on the chunk using the private key to generate a signature, as is conventional, which signature is then appended to the chunk. Client 110 selects each chunk of the message, at step 220, and signs each chunk, at step 216. An example of such a message, in XML form, is shown in FIG. 13. When it has signed all chunks, as indicated at step 218, client 110 attaches the mark-up message that is now composed of the signed chunks to the plain-text message, at step 222, and sends off the message for delivery to its recipient(s), at step 224. Client 110 may also attach a copy of the unsigned mark-up message to the plain-text message.

Figure 5:
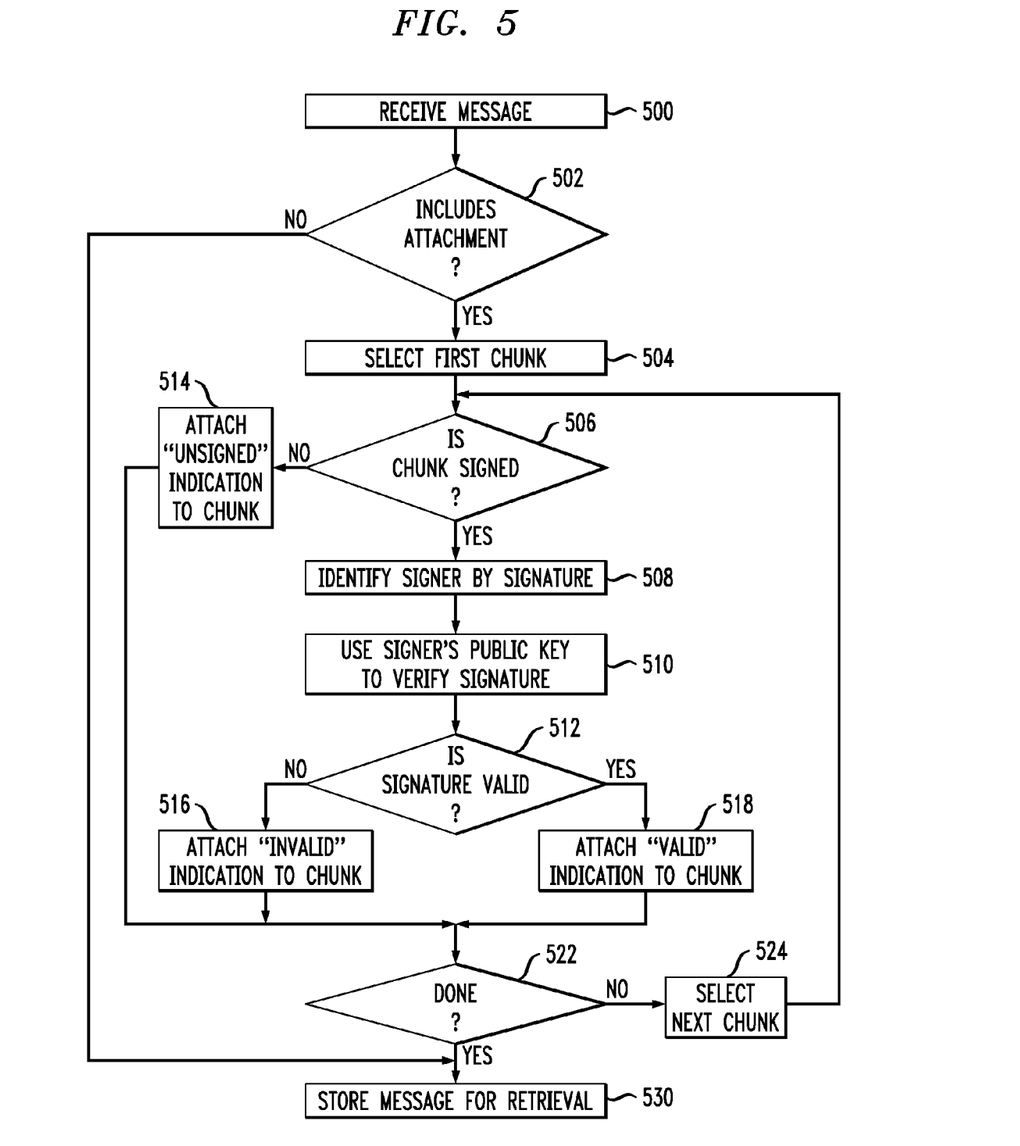
FIG. 5 is a functional flow diagram of message-receipt operations of a messaging client of the system of FIG. 1.

FIG. 5 illustrates the process of receiving a message on a client 110, 112 of FIG. 1—let us assume client 112 for purposes of this illustration. If client 112 were conventional, it would merely receive the message, at step 500, and store it for retrieval by the user of client 512, at step 530. But client 112 is adapted to support traceability. Therefore, upon receiving a message, at step 500, client 112 checks whether the message includes an attachment, at step 502. If the message is from a conventional client, it may or may not include an attachment, and chunks of that attachment may or may not be signed. But if the message is from a client that is adapted to support traceability, such as client 110, the message will have a signed attachment.

If the message does not include an attachment, client 112 merely stores the received message, at step 530. If the message does include an attachment, client 112 selects the first chunk of the signed attachment, at step 510, and checks if it is signed, at step 506. If it is not signed, client 112 attaches an "unassigned" indication to the chunk, at step 508. The indication may be, for example, an icon that is displayed alongside the chunk when the chunk is displayed by client 112 and that indicates that the chunk is not signed.

Figure 14:
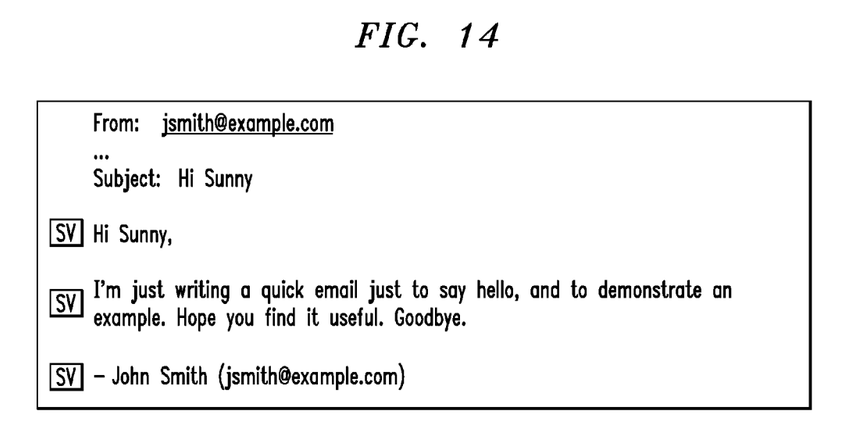
FIG. 14 shows the appearance of the message of FIG. 13 on a display of a recipient.

If it finds at step 506 that the chunk is signed, client 112 uses the included signature to identify the signer, in a conventional matter, at step 512, and uses the signer's public key to verify the signature, also in a conventional manner, at step 514. If client 112 does not already have the signer's public signature, it obtains it from key server 106 of FIG. 1, again in a conventional manner. If it determines at step 514 that the chunk's signature is invalid, client 112 attaches an "invalid" indication to the chunk, at step 516. If it determines at step 514 that the chunk's signature is valid, client 112 attaches a "valid" indication to the chunk, at step 518. Client 112 then selects the next chunk of the message, at step 524, and repeats steps 506-514 therefor. When it is done processing the whole message, as indicated at step 522, client 112 stores the message with the appended signature validity indications, at step 530. When displayed, the message of FIG. 13 illustratively looks as shown in FIG. 14, where the "SV" icons indicate that the corresponding message chunks are signed and the signatures are verified.

Figure 3:
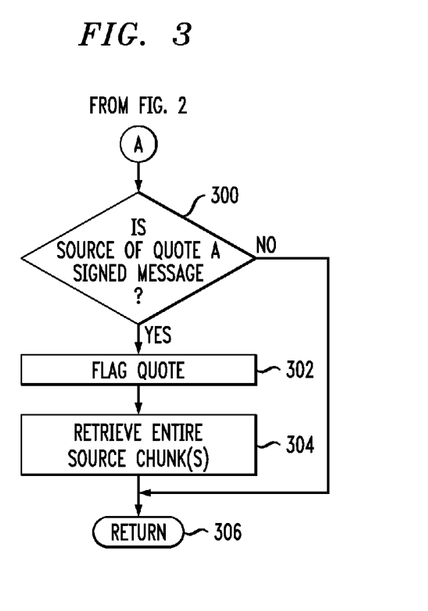
FIG. 3 is a functional flow diagram of a cut or a copy operation of a cut-and-paste operation of the message-generation operations of FIG. 2.

Let us return to FIG. 2 to consider the process of generating a threaded message on a client 110, 112 of FIG. 1. Let us assume that the threaded message is a response by a user of client 112 to the message received from client 110, for purposes of illustration. When a user of a client 112 writes a message, client 112 uses a mark-up language to form the message in a conventional manner, at step 200. If during the writing of the message the user performs a cut-and-paste operation to include pre-existing material in the message—a quote from the message that was received from client 110, for example—client 112 detects the cutting or copying operation, at step 202, and in response performs the process that is shown in FIG. 3. At step 300 of FIG. 3, client 112 checks the source material to determine if it is signed. If the source is, for example, the message from client 110, it is signed, and so client 112 flags the quote, at step 302, retrieves the entire chunk or chunks from the source material that is or are the source of the quote, at step 304, and then returns at step 306 to the process of FIG. 2.

Figure 4:
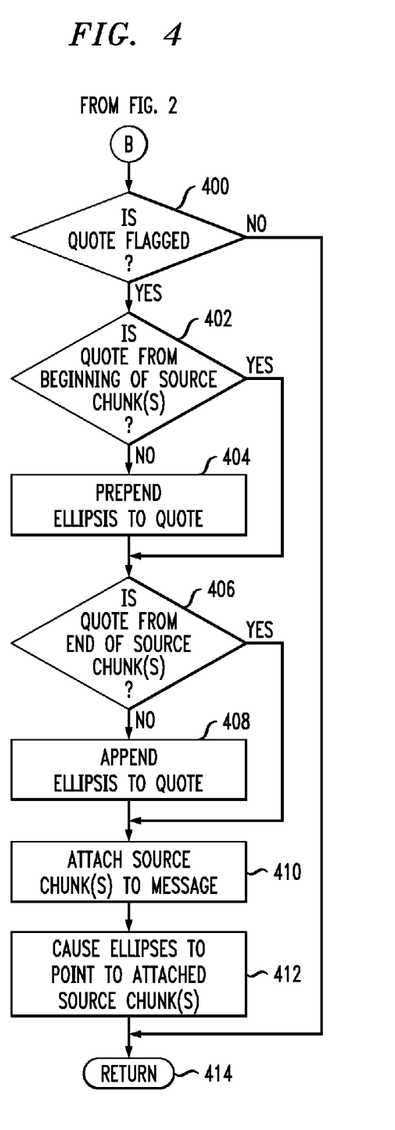
FIG. 4 is a functional flow diagram of a paste operation of the cut-and-paste operation of the message-generation operations of FIG. 2.
Figure 15:
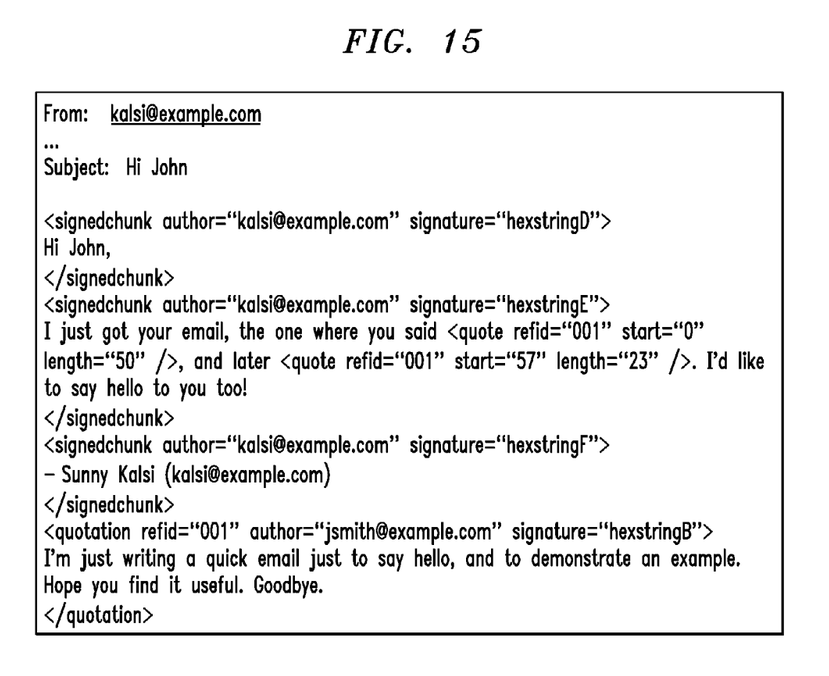
FIG. 15 shows an illustrative message generated by the operations of FIGS. 2-4.

When the user of client 112 performs the paste portion of the cut-and-paste operation, client 112 detects the pasting, at step 204, and in response performs the process that is shown in FIG. 4. At step 400, client 112 checks if the quote is flagged (see step 302 of FIG. 3). If not, client 112 merely returns at step 414 to the process of FIG. 2. But if the source of the quote is signed, such as the message from client 110, the quote will have been flagged, and so client 112 checks the retrieved source chunk (see step 304 of FIG. 3) to determine if the quote is from the beginning of the source chunk, at step 402. If the quote is not from the beginning of the source chunks, client 112 indicates that source material precedes the quote by prepending a symbol, such as an ellipsis, to the quote, at step 404. Following step 404, or if the quote is from the beginning of the source chunk, client 112 checks the retrieved source chunk to determine if the quote is from the end of the source chunk, at step 406. If the quote is not from the end of the source chunk, client 112 indicates that source material follows the quote by appending a symbol, such as an ellipsis, to the quote, at step 408. Following step 408, or if the quote is from the end of the source chunk, client 112 attaches the entire retrieved source chunk to the message, at step 410, and uses the symbol as a pointer and a link to point to the attached source chunk, at step 412. An example of such a message is shown in FIG. 15. Client 112 then returns at step 414 to the process of FIG. 2.

Figure 6:
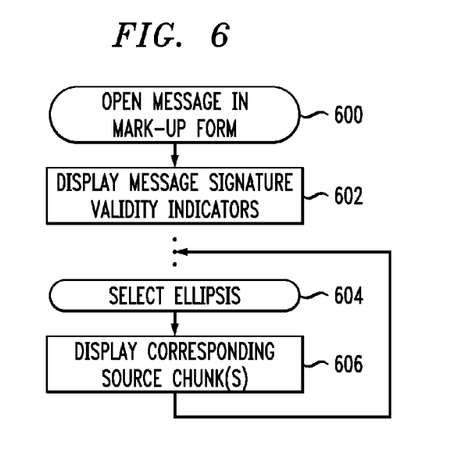
FIG. 6 is a functional flow diagram of message-displaying operations of a messaging client of the system of FIG. 1.
Figure 16:
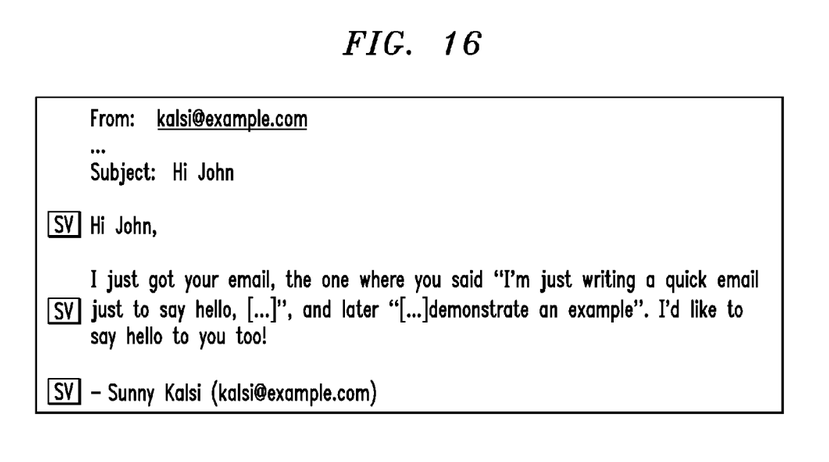
FIG. 16 shows the appearance of the message of FIG. 15 on a display of a recipient.

FIG. 6 illustrates the process of displaying a signed message in mark-up form on a client 110, 112—let us assume the displaying of the reply message from client 112 on client 110, for example. When the user of client 110 opens the message, at step 600, client 110 displays the message along with the indication for each chunk of whether the signature of the chunk is valid or invalid, at step 602. A displayed form of the message of FIG. 15 is shown in FIG. 16. Note the "[ . . . ]" that appears. Note also that the "quote" tag is replaced with the actual part of the quotation (characters "0" to "50", and later "57" to "80"), and that the quotation itself is not displayed. The "refid" for the quotation is an auto-generated unique key. Note that despite the fact that the quotation is unique, any number of quotes can refer to it. The display of the quote can show that this text is from someone else, for example, by using background coloring. Note that the source chunk is not displayed. This is akin to using "display: none" in a cascading style sheet with HTML. The HTML tag and all of its associated text are still in the HTML file, but the browser does not display them. Typically, this "display" property is changed to display the text under certain conditions. In this instance, if the message contains a quote and the user of client 110 selects an ellipsis that accompanies the quote, at step 604, client 110 responds by displaying the entire source chunk that corresponds to the quote, at step 606.

Figure 7:
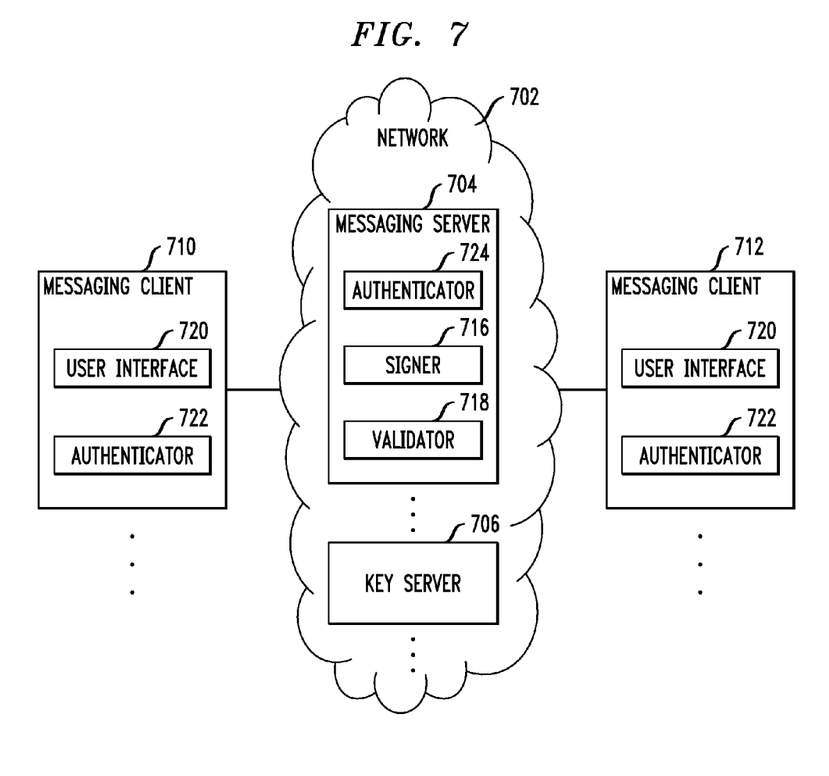
FIG. 7 is a block diagram of a communications system that includes a second illustrative embodiment of the invention.

While FIG. 1 shows an embodiment of a message communications system where signing and signature validation is effected on messaging clients 110, 116, FIG. 7 shows an embodiment of a communications system where signing and signature validation is effected on one or more messaging servers 704 using one or more key servers 706. Elements 702-720 of FIG. 7 correspond to elements 102-120 of FIG. 1. But whereas elements 116 and 118 are located in messaging clients 110 and 112 in FIG. 1, elements 716 and 718 are located in messaging sever 704 in FIG. 7. In order to support trustworthy traceability, the system of FIG. 7 includes an authentication mechanism comprising an authenticatee element 722 on each client 710, 712 and an authenticator element 724 on messaging server 704. The authentication mechanism of FIG. 7 is conventional and enables server 704 to ensure identities of the users of clients 710, 712.

Figure 8:
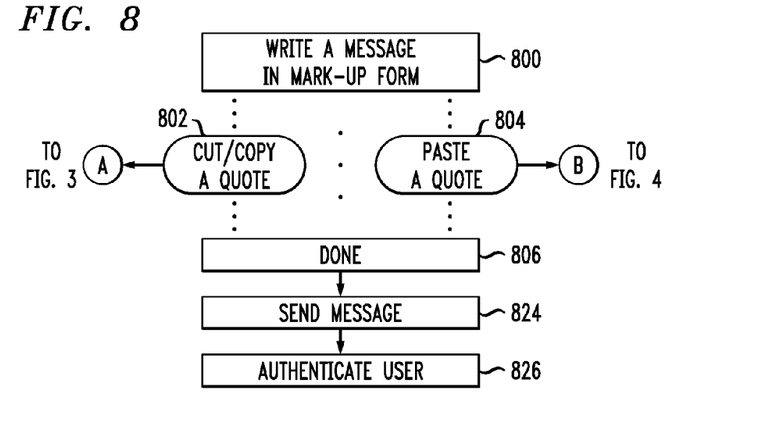
FIG. 8 is a functional flow diagram of message-generation operations of a messaging client of the system of FIG. 7.

FIG. 8 illustrates the process of composing a message on a client 710, 712 of FIG. 7. Steps 800-806 of FIG. 7 are the same as steps 200-206 of FIG. 2. But when the user of a client 710, 712 is done writing the message, client 710, 712 sends the message to server 704 for delivery to recipient(s), at step 824, and authenticates the user of client 710, 712 with server 704, at step 826.

Figure 9:
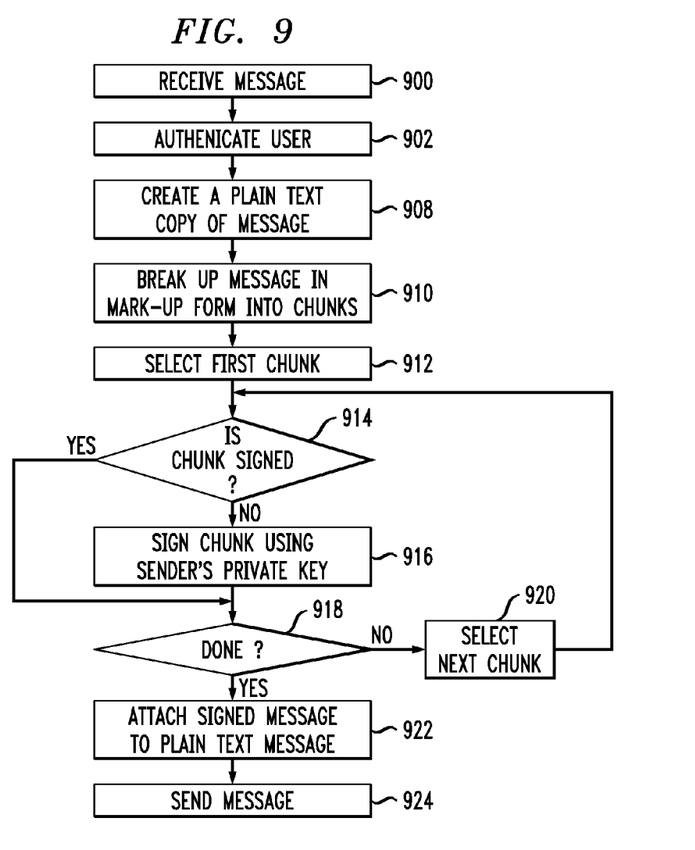
FIG. 9 is a functional flow diagram of message-signing operations of a messaging server of the system of FIG. 7.

FIG. 9 shows the process of signing the message that is performed by server 704. Upon receiving the message from client 710, 712, at step 900, server 704 authenticates the user of client 710, 712, at step 902, and then signs the message at steps 908-924 which duplicate steps 208-224 of FIG. 2.

Figure 10:
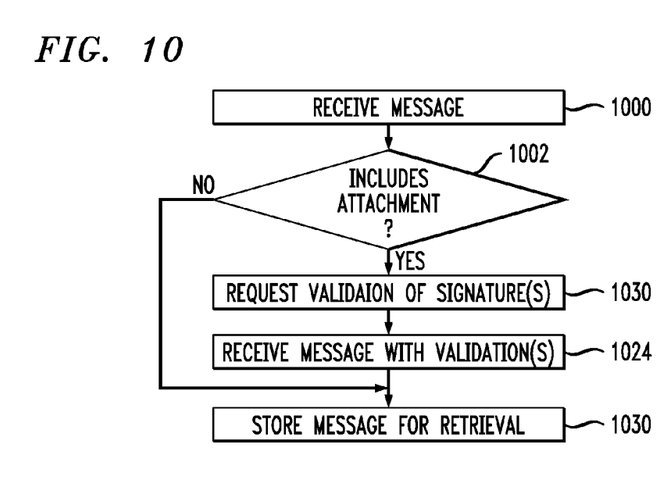
FIG. 10 is a functional flow diagram of message-receipt operations of a messaging client of the system of FIG. 7.

FIG. 10 illustrates the process of receiving a message on a client 710, 712 of FIG. 7. Steps 1000-1002 and 1030 of FIG. 10 are the same as steps 500-502 and 530 of FIG. 5. But when a client 710, 712 determines that the received message includes an attachment, at step 1002, it requests server 704, at step 1030, to perform signature validation.

Figure 11:
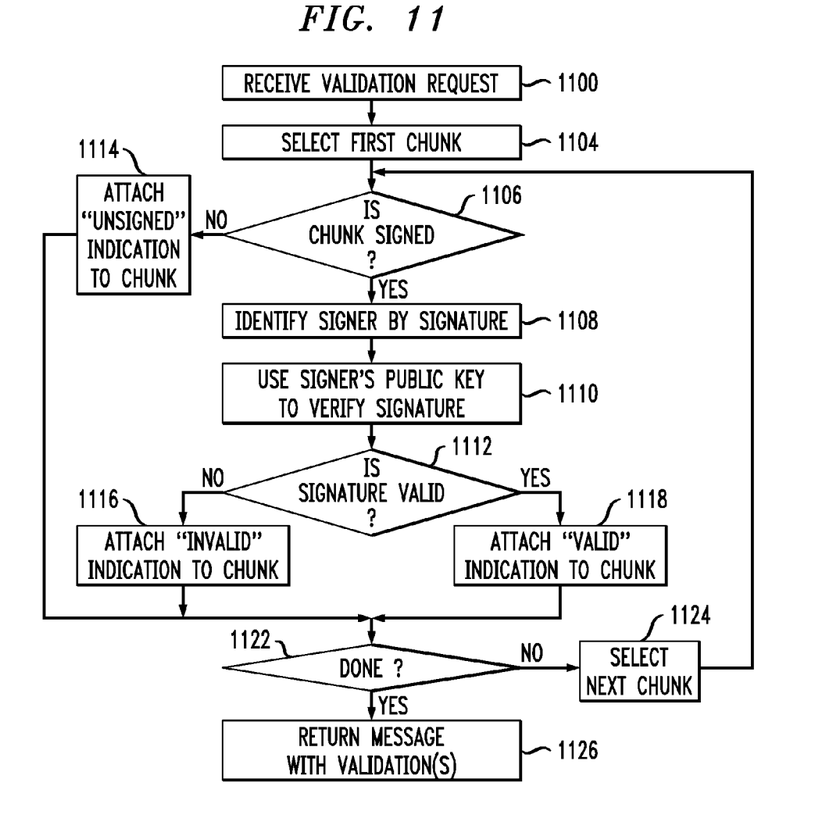
FIG. 11 is a functional flow diagram of signature-verification operations of the messaging server of the system of FIG. 7.

FIG. 11 illustrates the process of signature validation performed by server 704. In response to receiving the validation request, at step 1100, server 704 performs the validation at step 1104-1124 that are the same as steps 504-524 of FIG. 5. Server 704 then sends the validated message to client 710, 712, at step 1122. Client 710, 712 receives the validated message, at step 1024 of FIG. 10, and stores it for retrieval, at step 1030.

Message displaying on a client 710, 712 is done in the manner shown in FIG. 6.

In an alternative embodiment, the messaging system may be a hybrid wherein signing and validation is effected by a messaging server at one end of communicating of a message and signing and validation is effected by messaging client at the other end of communicating of a message.

Figure 12:
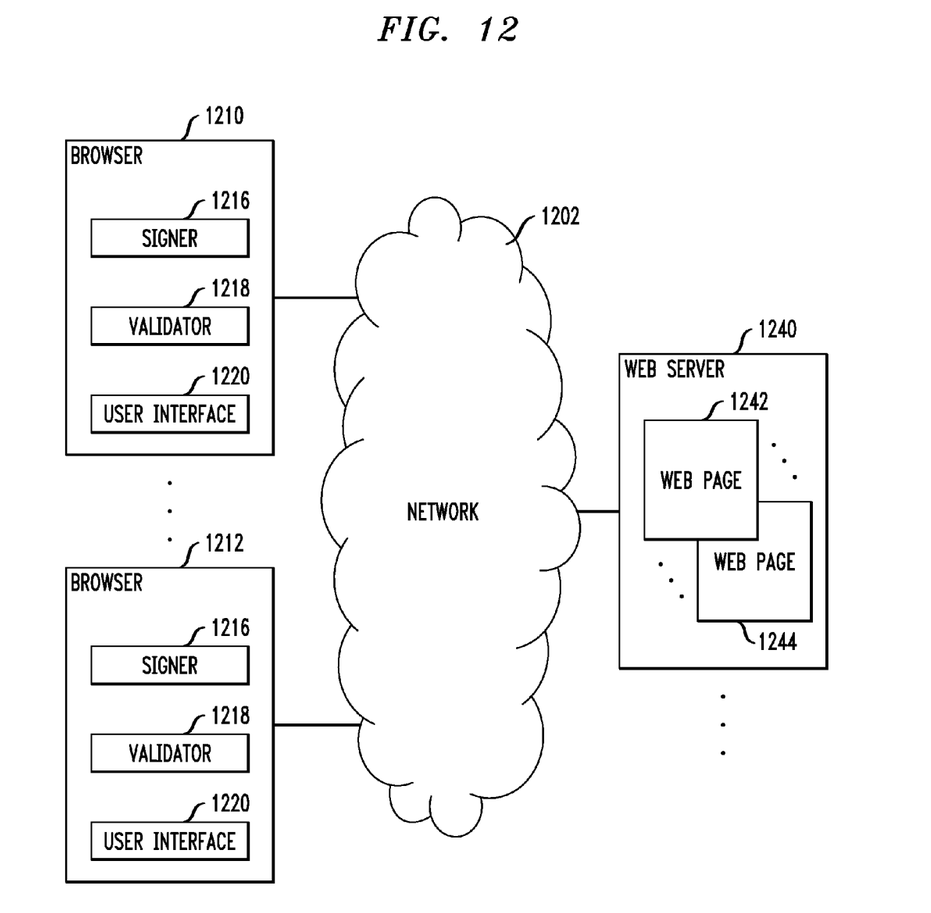
FIG. 12 is a block diagram of a communications system that includes a third illustrative embodiment of the invention.

FIG. 12 shows a message communication system that includes a third illustrative embodiment of the invention. The system of FIG. 12 comprises web browsers 1210, 1212 that are interconnected by a communications network 1202, such as the Internet, to one or more web servers 1240. Web server 1240 implements interactive web pages 1242, 1244. That is, web server 1240 both receives and serves web pages 1242, 1244 from/to browsers 1210, 1212. Web server 1240 illustratively implements a bulletin-board-like forum to which users of browsers 1210, 1212 can post messages and from which they can receive posted messages. Or, web server illustratively implements a blogosphere where users of browsers 1210, 1212 can post their blogs that other users of browsers 1210, 1212 can retrieve and post comments about.

According to the invention, users of browsers 1210, 1212 can create web pages 1242, 1244 that quote other web pages 1242, 1244, in the same manner as users of clients 1210, 112 in FIG. 1 can create messages that quote other messages. There is an equivalence between browsers 1210, 1212 and clients 110, 112 and between the web pages of the embodiment of FIG. 12 and the messages of the embodiment of FIG. 1, such that the operation of browsers 1210, 1212 is likewise represented by FIGS. 2-6.

Of course, various changes and modifications to the illustrative embodiment described above will be apparent to those skilled in the art. For example, quotes from different authors may be displayed in different colors, or the name of the quote's author may be displayed as a "tooltip" when a pointer is pointed to the displayed quote, or read aloud for the blind. In addition, the line between the functions the server and client perform can be drawn arbitrarily, as can the functionality of the key server and it's interoperation between messaging servers, or other key servers. For example, messaging servers, key servers, and the client could be integrated into one server, or a messaging server could span multiple servers, or multiple key servers could service a single messaging server or client. Finally, the various incarnations of these messaging and key servers, as well as clients could interoperate (or notably, not interoperate). These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   originating a first electronic message comprising user content;
   receiving a user selection of a quoted portion of a second electronic message;
   receiving a user instruction to perform a copy and paste operation on the quoted portion to incorporate in the user content of the first electronic message the quoted portion of the second electronic message;
   in response to detecting the copy and paste operation, determining if the quoted portion corresponds to a digitally signed source chunk of the second electronic message;
   in response to the quoted portion comprising entire said digitally signed source chunk, including the digitally signed source chunk and its digital signature into the user content of the first electronic message;
   in response to the quoted portion comprising less than entire said digitally signed source chunk, including the quoted portion and a delimiting character into the user content of the first electronic message and attaching the digitally signed source chunk and its digital signature to the first electronic message;
   breaking up the first electronic message into a plurality of chunks;
   signing any unsigned said chunks of the first electronic message with a digital signature of an originator of the first electronic message;
   delivering the first electronic message to a recipient;
   validating the digital signatures of the plurality of chunks of the first electronic message;
   presenting the first electronic message to the recipient, including indicating for the plurality of chunks of the first electronic message results of the validating of the digital signatures; and
   in response to the recipient selecting the delimiting character of the quoted portion in the first electronic message, presenting the digitally signed source chunk for display to the recipient, including indicating the results of the validating of the digital signature of the digitally signed source chunk.

2. The method of claim 1 wherein the breaking up and the signing is effected by a client or a browser of the originator.

3. The method of claim 1 wherein the breaking up and the signing is effected by a messaging server.

4. The method of claim 1 wherein the validating is effected by a messaging client or a browser of the recipient.

5. The method of claim 1 wherein the validating is effected by a messaging server.

6. The method of claim 1 wherein:
   the validating is effected by one of a message client or a web browser of the originator.

7. The method of claim 1, wherein receiving the user instruction to perform the copy and paste operation on the quoted portion to incorporate in the user content of the first electronic message the quoted portion of the second electronic message comprises the first electronic message referencing within the user content the quoted portion of the digitally signed source chunk, wherein the digitally signed source chunk and its digital signature is appended to the first electronic message.

8. The method of claim 7, wherein referencing the quoted portion comprises instructing presentation to the recipient the quoted portion inline in the user content of the first electronic message and instructing the digitally signed source chunk to be withheld from presentation to the recipient until selection of the quoted portion by the recipient.

9. The method of claim 1 further comprising:
   in response to the quoted portion comprising entire said digitally signed source chunk, including separate from the user content of the first electronic message the digitally signed source chunk and its digital signature by attaching the digitally signed source chunk and its digital signature to the first electronic message.

10. The method of claim 1, wherein including the quoted portion and the delimiting character into the user content of the first electronic message and appending the digitally signed source chunk and its digital signature to the first electronic message comprises instructing presentation to the recipient the quoted portion and the delimiting character inline in the user content of the first electronic message and instructing the digitally signed source chunk to be withheld from presentation to the recipient until selection of the quoted portion by the recipient.

11. A non-transient computer-readable medium containing instructions which, when executed in a computer, cause the computer to:
   originate a first electronic message comprising user content;
   receive a user selection of a quoted portion of a second electronic message;
   receive a user instruction to perform a copy and paste operation on the quoted portion to incorporate in the first electronic message the quoted portion of the second electronic message;
   determine if the quoted portion corresponds to a digitally signed source chunk of the second electronic message that is digitally signed by a first party;
   include the digitally signed source chunk and its digital signature into the user content of the first electronic message if the quoted portion comprises entire said digitally signed source chunk or include the quoted portion and a delimiting character into the user content of the first electronic message and appending the digitally signed source chunk and its digital signature to the first electronic message if the quoted portion comprises less than entire said digitally signed source chunk;
   break up the first electronic message into a plurality of chunks;
   sign any individual ones of the plurality of chunks that are unsigned with a digital signature of an originator of the first electronic message;
   validate the digital signature of the plurality of chunks of the first electronic message and of any attached digitally signed source chunks;

present the first electronic message for display in a threaded communication with validation of the digital signatures of the plurality of chunks and any attached digitally signed source chunks; and present the digitally signed source chunk for display in the threaded communication, including the results of the validation of the digital signature of the digitally signed source chunk in response to a recipient selecting the delimiting character.

12. An apparatus comprising:

means for originating a first electronic message comprising user content;

means for receiving a user selection of a quoted portion of a second electronic message;

means for receiving a user instruction to perform a copy and paste operation on the quoted portion to incorporate in the user content of the first electronic message the quoted portion from a digitally signed source chunk of the second electronic message;

means for determining if the quoted portion corresponds to the digitally signed source chunk of the second electronic message;

means for including separate from the user content of the first electronic message, the digitally signed source chunk of the second electronic message and its digital signature with the first electronic message, in response to determining that the quoted portion corresponds to the digitally signed source chunk;

means for breaking up the first electronic message into a plurality of chunks; and means for signing any unsigned said chunks of the first electronic message with a digital signature of an originator of the first electronic message.

* * * * *